US012695495B2

(12) United States Patent
Bai et al.

(10) Patent No.:     US 12,695,495 B2
(45) Date of Patent:        Jul. 28, 2026

(54) CHANNEL STATE INFORMATION REPORT CONFIGURATION FOR NON-SERVING CELL REFERENCE SIGNAL

(71) Applicant: QUALCOMM Incorporated, San Diego, CA (US)

(72) Inventors: Tianyang Bai, Somerville, NJ (US); Yan Zhou, San Diego, CA (US); Fang Yuan, Beijing (CN); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/550,248

(22) PCT Filed: Jun. 9, 2021

(86) PCT No.: PCT/CN2021/099136
§ 371 (c)(1),
(2) Date: Sep. 12, 2023

(87) PCT Pub. No.: WO2022/236906
PCT Pub. Date: Nov. 17, 2022

(65) Prior Publication Data
US 2024/0171253 A1     May 23, 2024

(30) Foreign Application Priority Data

May 11, 2021    (WO) ................ PCT/CN2021/093129

(51) Int. Cl.
*H04B 7/06*        (2006.01)
*H04W 24/08*      (2009.01)
*H04W 24/10*      (2009.01)

(52) U.S. Cl.
CPC ........ *H04B 7/06966* (2023.05); *H04W 24/08* (2013.01); *H04W 24/10* (2013.01)

(58) Field of Classification Search
CPC .... H04L 5/0048; H04W 24/10; H04W 24/08; H04W 72/046; H04B 7/06966
See application file for complete search history.

(56)            References Cited

U.S. PATENT DOCUMENTS 11,088,751 B2 *   8/2021   Davydov ............. H04B 17/345
11,265,880 B2 *   3/2022   Nagaraja ............... H04L 5/0048
(Continued)

FOREIGN PATENT DOCUMENTS

CN         102857981 A        1/2013
CN         110089043 A        8/2019
(Continued)

OTHER PUBLICATIONS

Futurewei: "Enhancement on Multi-Beam Operation", 3GPP TSG RAN WG1 Meeting #104-e, R1-2100044, e-Meeting, Jan. 25, 2021-Feb. 5, 2021, 13 Pages, Feb. 5, 2021, Sections 2-5, the whole document.

(Continued)

*Primary Examiner* — Mong-Thuy T Tran
(74) *Attorney, Agent, or Firm* — ArentFox Schiff, LLP

(57)              ABSTRACT

The present disclosure provides systems, devices, apparatus and methods, including computer programs encoded on storage media, for channel state information report configuration for non-serving cell reference signal. A user equipment may receive, from a serving cell, a reference signal (RS) measurement configuration and a RS report configuration associated with a non-serving cell. The UE also may monitor for a RS beam using a transmission configuration indicator (TCI) state associated with the non-serving cell based on the RS measurement configuration. The UE also (Continued)

may obtain one or more measurements of the RS beam associated with the non-serving cell. The UE also may transmit, to the serving cell, a beam report indicating the one or more measurements of the RS beam associated with the non-serving cell and beam measurements associated with a serving cell based on the RS report configuration.

40 Claims, 9 Drawing Sheets

(56) References Cited

U.S. PATENT DOCUMENTS

| | | | | |
|---|---|---|---|---|
| 11,963,055 | B2 * | 4/2024 | Raghavan | H04W 24/10 |
| 2020/0163074 | A1 * | 5/2020 | Tang | H04W 72/23 |
| 2021/0028843 | A1 * | 1/2021 | Zhou | H04B 7/063 |
| 2021/0153085 | A1 * | 5/2021 | Rahman | H04W 36/0058 |
| 2021/0297959 | A1 * | 9/2021 | Zhou | H04W 24/10 |
| 2022/0123815 | A1 * | 4/2022 | Karjalainen | H04B 7/06968 |
| 2022/0321240 | A1 * | 10/2022 | Zhang | H04B 7/0626 |
| 2023/0164607 | A1 * | 5/2023 | Koskela | H04W 24/10 |
| | | | | 370/328 |
| 2023/0180077 | A1 * | 6/2023 | Cui | H04L 5/0048 |
| | | | | 370/331 |
| 2024/0073727 | A1 * | 2/2024 | Zhou | H04W 24/10 |
| 2024/0154667 | A1 * | 5/2024 | Matsumura | H04L 5/0051 |

FOREIGN PATENT DOCUMENTS

| | | |
|---|---|---|
| CN | 110381531 A | 10/2019 |
| CN | 111095824 A | 5/2020 |
| WO | 2019215381 A1 | 11/2019 |
| WO | 2020063126 A1 | 4/2020 |
| WO | 2021066700 A1 | 4/2021 |

OTHER PUBLICATIONS

Huawei, et al., "Enhancements on Multi-Beam Operation", 3GPP TSG RAN WG1 Meeting #104-e, R1-2100208, E-meeting, Jan. 25, 2021-Feb. 5, 2021, Feb. 5, 2021, (Feb. 5, 2021), 13 Pages, section 2, the whole document.

International Search Report and Written Opinion—PCT/CN2021/ 093129—ISA/EPO—Feb. 10, 2022.

International Search Report and Written Opinion—PCT/CN2021/ 099136—ISA/EPO—Feb. 10, 2022.

Oppo: "Enhancements on Multi-Beam Operation", 3GPP TSG RAN WG1 #104-e, R1-2100118, e-Meeting, Jan. 25-Feb. 5, 2021, Jan. 18, 2021, 25 Pages, Sections 2.3, 7, Sections 2, 3, Section 7.2, and Figure 7-3.

Vivo: "Further Discussion on Multi Beam Enhancement", 3GPP TSG RAN WG1 #103-e, R1-2007644, Nov. 13, 2020, 26 Pages, Oct. 26, 2020-Nov. 13, 2020, Section 2, Sections 2.4, 2.5, The Whole Document.

* cited by examiner

400

Figure 5:
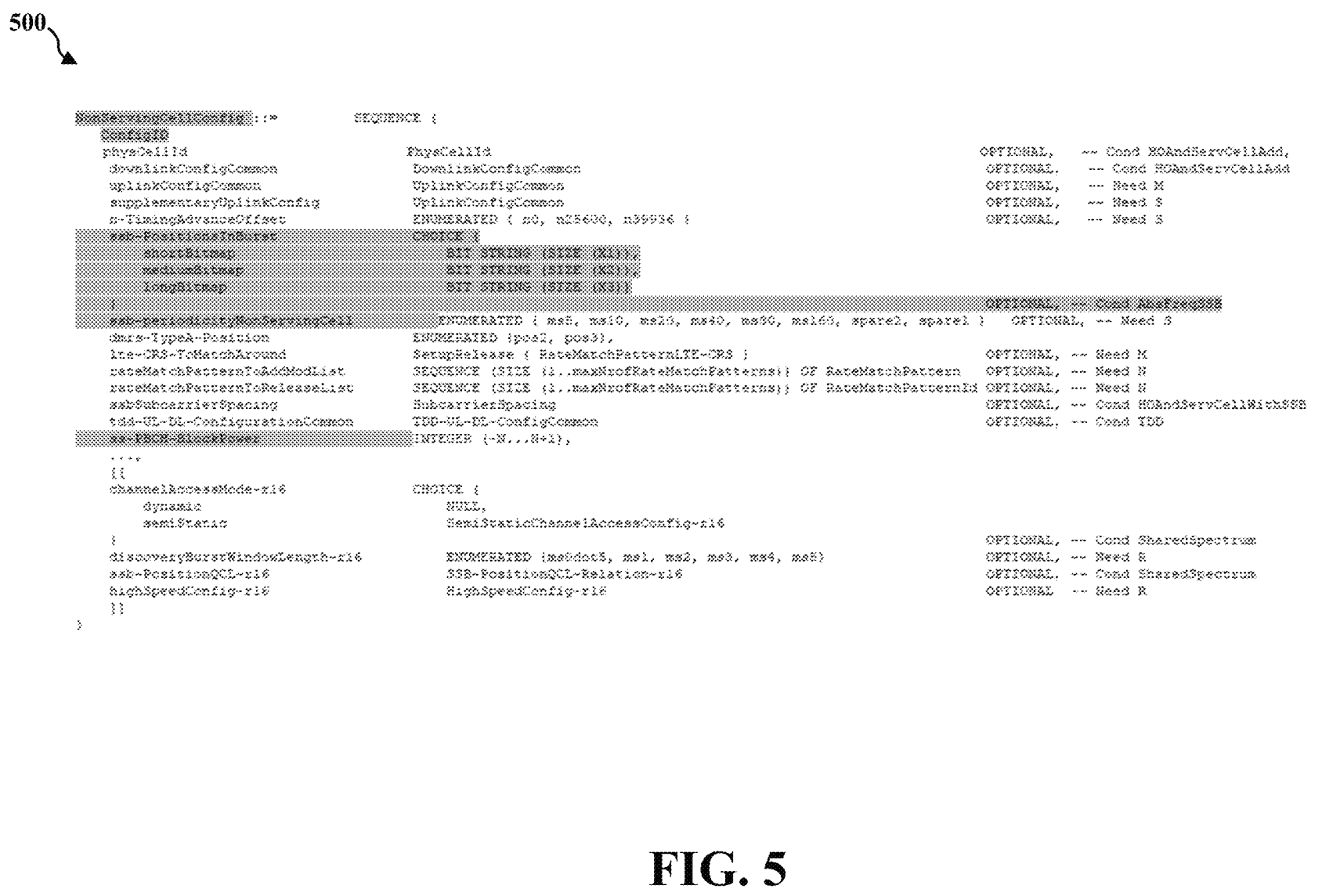

500

```
                                  SEQUENCE {
    phyCellId                     PhysCellId
    downlinkConfigCommon          DownlinkConfigCommon
    uplinkConfigCommon            UplinkConfigCommon
    supplementaryUplinkConfig     UplinkConfigCommon
    n-TimingAdvanceOffset         ENUMERATED { n0, n25600, n39936 {

OPTIONAL,   -- Cond NGRANAsErvCellAdd,
                                                                          OPTIONAL,   -- Cond NGRANAsErvCellAdd
                                                                          OPTIONAL,   -- Need M
                                                                          OPTIONAL,   -- Need S
                                                                          OPTIONAL,   -- Need S ssb-Type-Position
    kre-CRS-ToMatchAround         ENUMERATED {pos4, pos3},
                                  SetupRelease { RaceMatchPatternLTE-CRS }
    rateMatchPatternToAddModList  SEQUENCE (SIZE (1..maxNrofRateMatchPatterns)) OF RateMatchPattern    OPTIONAL,   -- Need N
    rateMatchPatternToReleaseList SEQUENCE (SIZE (1..maxNrofRateMatchPatterns)) OF RateMatchPatternId  OPTIONAL,   -- Need N
    subcarrierSpacing             SubcarrierSpacing                                                    OPTIONAL,   -- Cond NGRANAsErvCellAddMid
    tdd-UL-DL-ConfigurationCommon TDD-UL-DL-ConfigCommon                                               OPTIONAL,   -- Cond TDD
                                  INTEGER (-N..N+1), channelAccessMode-r16         CHOICE {
        dynamic                   NULL,
        semiStatic                SemiStaticChannelAccessConfig-r16
                                  }
    discoveryBurstWindowLength-r16  ENUMERATED {ms0dot5, ms1, ms2, ms3, ms4, ms5}
    ssb-PositionQCL-Relation-r16  SSB-PositionQCL-Relation-r16
    highSpeedConfig-r16           HighSpeedConfig-r16
    }]
```

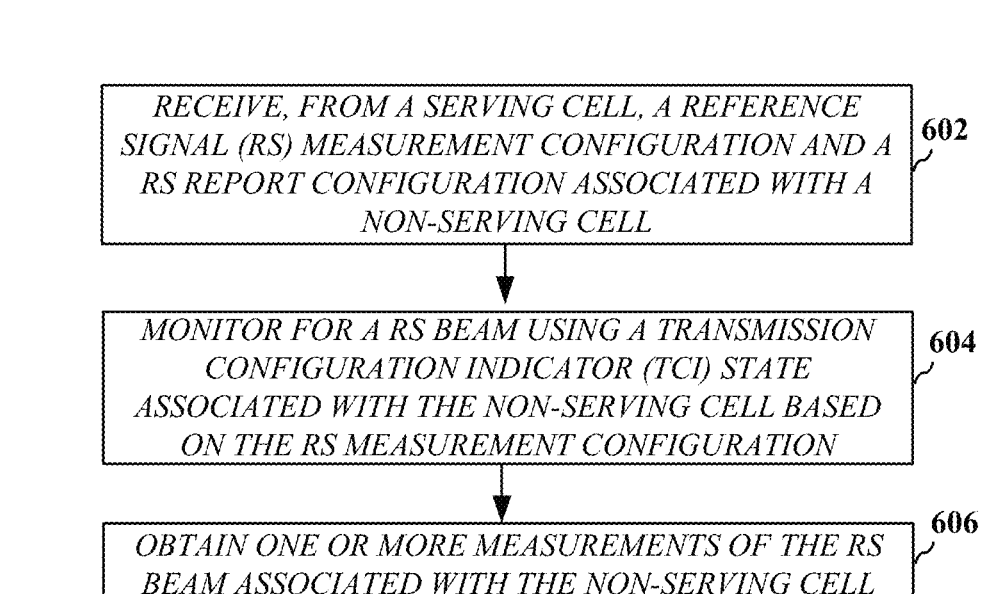

RECEIVE, FROM A SERVING CELL, A REFERENCE SIGNAL (RS) MEASUREMENT CONFIGURATION AND A RS REPORT CONFIGURATION ASSOCIATED WITH A NON-SERVING CELL  602

MONITOR FOR A RS BEAM USING A TRANSMISSION CONFIGURATION INDICATOR (TCI) STATE ASSOCIATED WITH THE NON-SERVING CELL BASED ON THE RS MEASUREMENT CONFIGURATION  604

OBTAIN ONE OR MORE MEASUREMENTS OF THE RS BEAM ASSOCIATED WITH THE NON-SERVING CELL  606

TRANSMIT, TO THE SERVING CELL, A BEAM REPORT INDICATING THE ONE OR MORE MEASUREMENTS OF THE RS BEAM ASSOCIATED WITH THE NON-SERVING CELL AND BEAM MEASUREMENTS ASSOCIATED WITH A SERVING CELL BASED ON THE RS REPORT CONFIGURATION  608

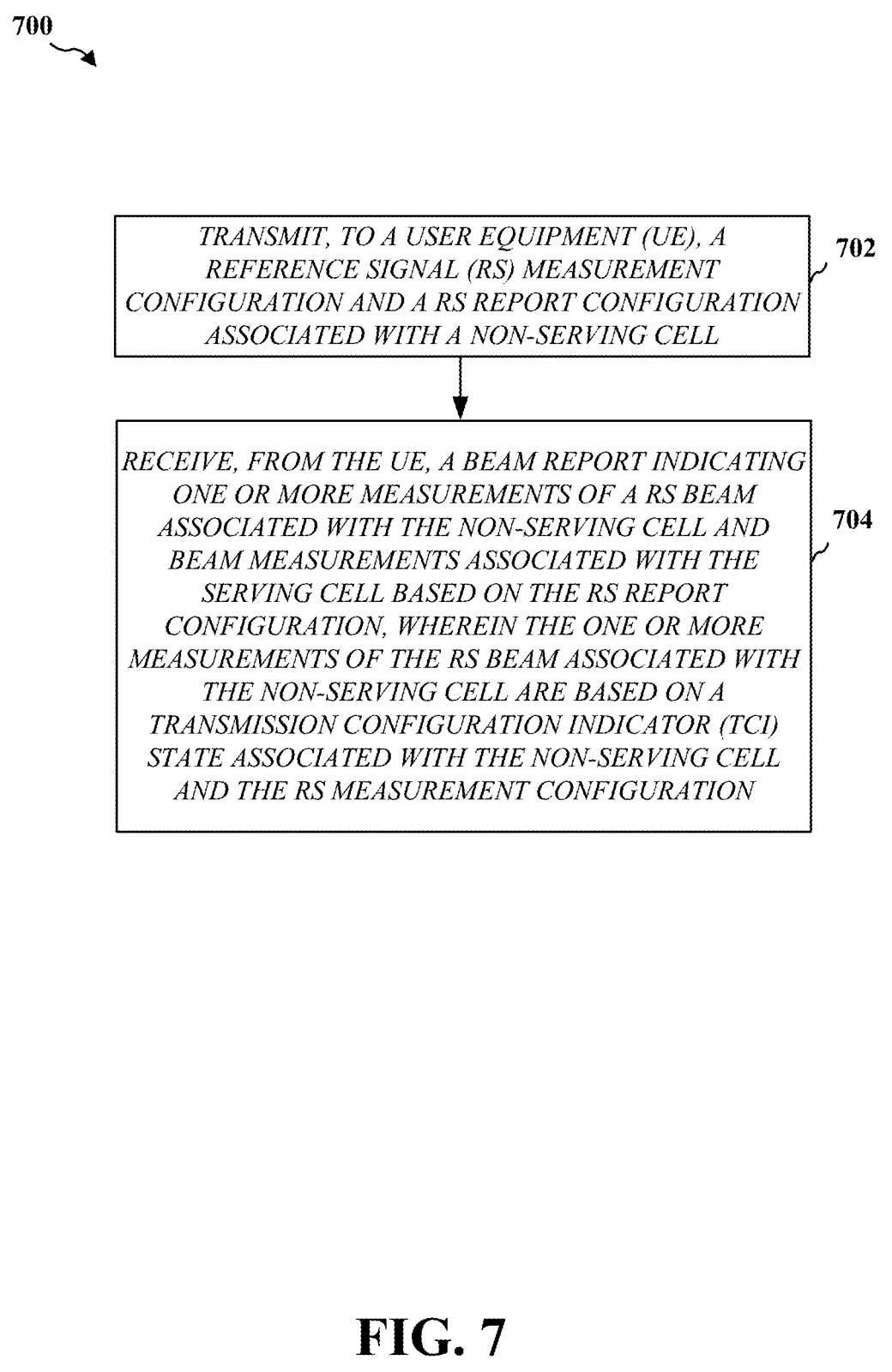

TRANSMIT, TO A USER EQUIPMENT (UE), A REFERENCE SIGNAL (RS) MEASUREMENT CONFIGURATION AND A RS REPORT CONFIGURATION ASSOCIATED WITH A NON-SERVING CELL                702

RECEIVE, FROM THE UE, A BEAM REPORT INDICATING ONE OR MORE MEASUREMENTS OF A RS BEAM ASSOCIATED WITH THE NON-SERVING CELL AND BEAM MEASUREMENTS ASSOCIATED WITH THE SERVING CELL BASED ON THE RS REPORT CONFIGURATION, WHEREIN THE ONE OR MORE MEASUREMENTS OF THE RS BEAM ASSOCIATED WITH THE NON-SERVING CELL ARE BASED ON A TRANSMISSION CONFIGURATION INDICATOR (TCI) STATE ASSOCIATED WITH THE NON-SERVING CELL AND THE RS MEASUREMENT CONFIGURATION                704

FIG. 7

CHANNEL STATE INFORMATION REPORT CONFIGURATION FOR NON-SERVING CELL REFERENCE SIGNAL

CROSS REFERENCE TO RELATED APPLICATION(S)

This application is a National Phase entry of PCT Application No. PCT/CN2021/099136, entitled "CHANNEL STATE INFORMATION REPORT CONFIGURATION FOR NON-SERVING CELL REFERENCE SIGNAL" and filed on Jun. 9, 2021, which claims priority of PCT Application No. PCT/CN2021/093129, entitled "CHANNEL STATE INFORMATION REPORT CONFIGURATION FOR NON-SERVING CELL REFERENCE SIGNAL" and filed on May 11, 2021, both of which are expressly incorporated by reference herein in their entirety.

BACKGROUND

Technical Field

The present disclosure relates generally to communication systems, and more particularly, to channel state information report configuration for non-serving cell reference signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the at least one processor to receive, from a serving cell, a reference signal (RS) measurement configuration and a RS report configuration associated with a non-serving cell; monitor for a RS beam using a transmission configuration indicator (TCI) state associated with the non-serving cell based on the RS measurement configuration; obtain one or more measurements of the RS beam associated with the non-serving cell; and transmit, to the serving cell, a beam report indicating the one or more measurements of the RS beam associated with the non-serving cell and beam measurements associated with a serving cell based on the RS report configuration.

In another aspect of the disclosure, a method, a computer-readable medium, and an apparatus are provided. The apparatus may be a wireless device at a base station that includes a memory and at least one processor coupled to the memory. The memory may include instructions that, when executed by the at least one processor, cause the at least one processor to transmit, to a user equipment (UE), a reference signal (RS) measurement configuration and a RS report configuration associated with a non-serving cell; and receive, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating a configuration for a non-serving cell.

FIG. 6 is a flowchart of a process of wireless communication of a UE that facilitates channel state information report configuration for non-serving cell reference signal.

FIG. 7 is a flowchart of a process of wireless communication of a base station that configures the channel state information report configuration for non-serving cell reference signal.

DETAILED DESCRIPTION

Figure 1:
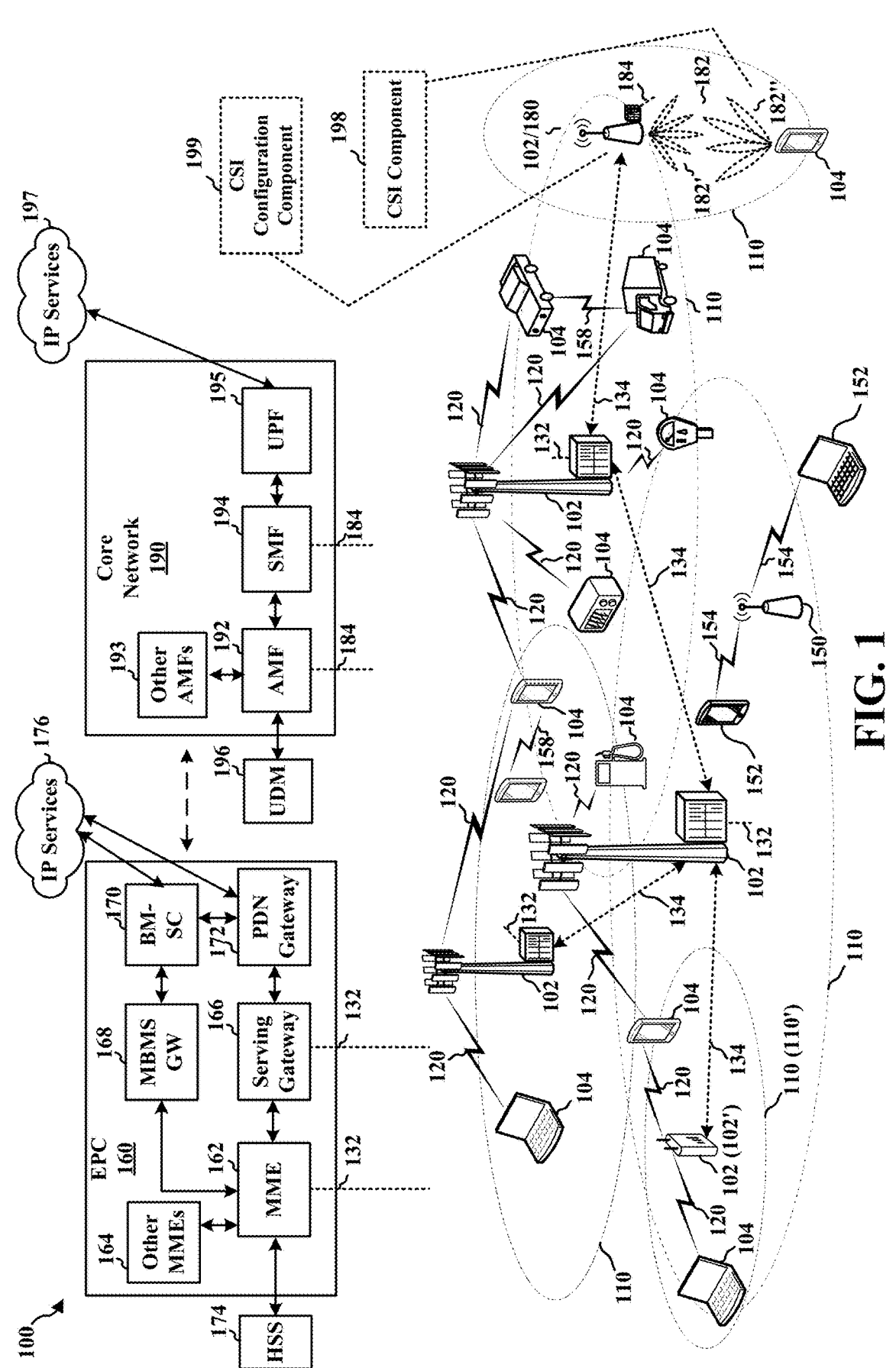
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Frequency range bands include frequency range 1 (FR1), which includes frequency bands below 7.225 GHZ, and frequency range 2 (FR2), which includes frequency bands above 24.250 GHz. Communications using the mmW/near mmW radio frequency (RF) band (e.g., 3 GHZ-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive, from a serving cell, a reference signal (RS) measurement configuration and a RS report configuration associated with a non-serving cell; monitor for a RS beam using a transmission configuration indicator (TCI) state associated with the non-serving cell based on the RS measurement configuration; obtain one or more measurements of the RS beam associated with the non-serving cell; and transmit, to the serving cell, a beam report indicating the one or more measurements of the RS beam associated with the non-serving cell and beam measurements associated with a serving cell based on the RS report configuration (e.g., CSI component 198). In other aspects, the BS 102/180 may be configured to transmit, to a user equipment (UE), a reference signal (RS) measurement configuration and a RS report configuration associated with a non-serving cell; and receive, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration (e.g., CSI configuration component 199). Although the following description may be focused on 5G NR, the concepts described herein may be applicable to other similar areas, such as LTE, LTE-A, CDMA, GSM, and other wireless technologies.

Figures 2A, 2B, 2C, 2D:
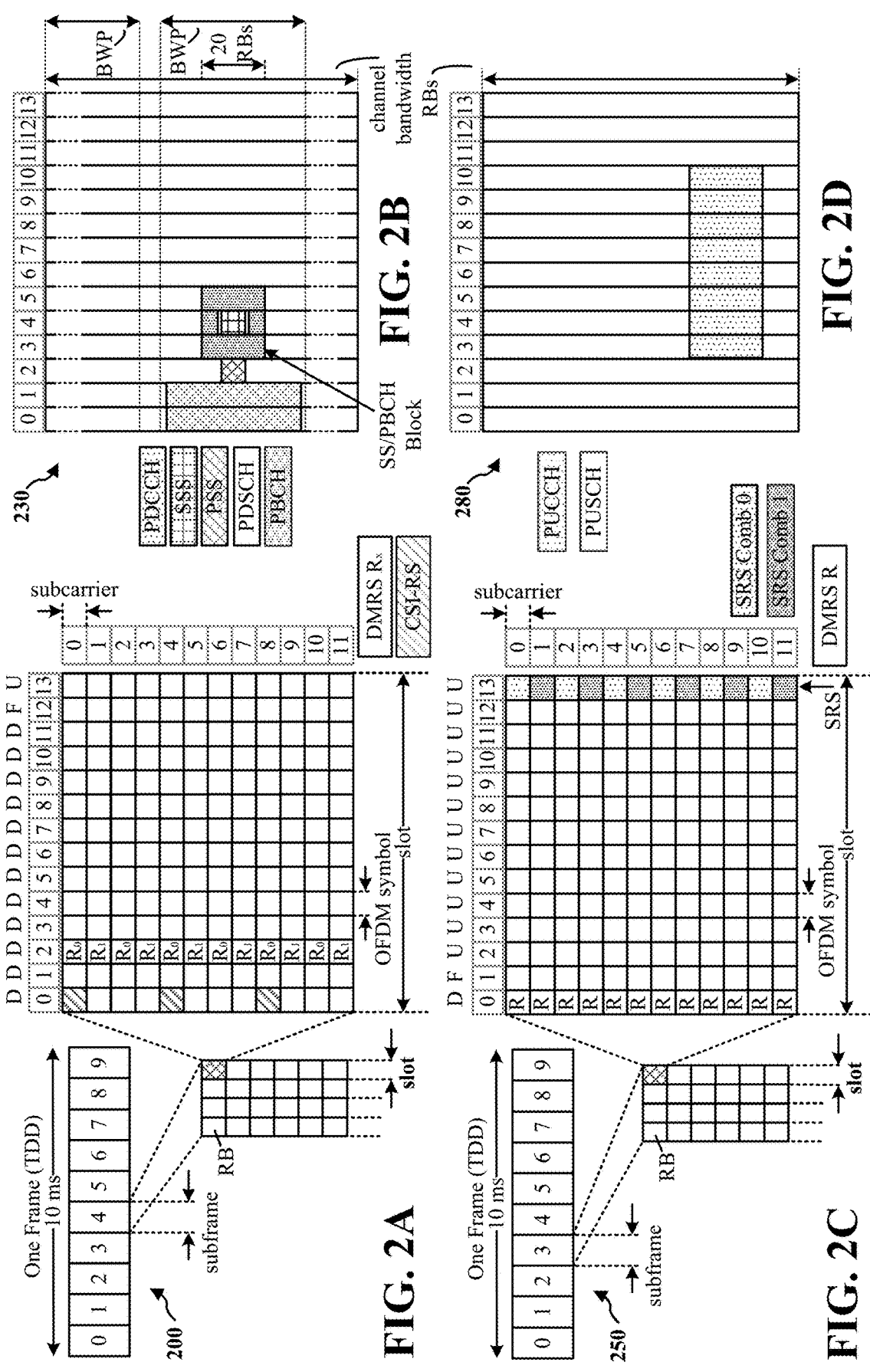
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative acknowledgement (NACK) feedback. The PUSCH carries data, and may additionally be used to carry a buffer status report (BSR), a power headroom report (PHR), and/or UCI.

Figure 3:
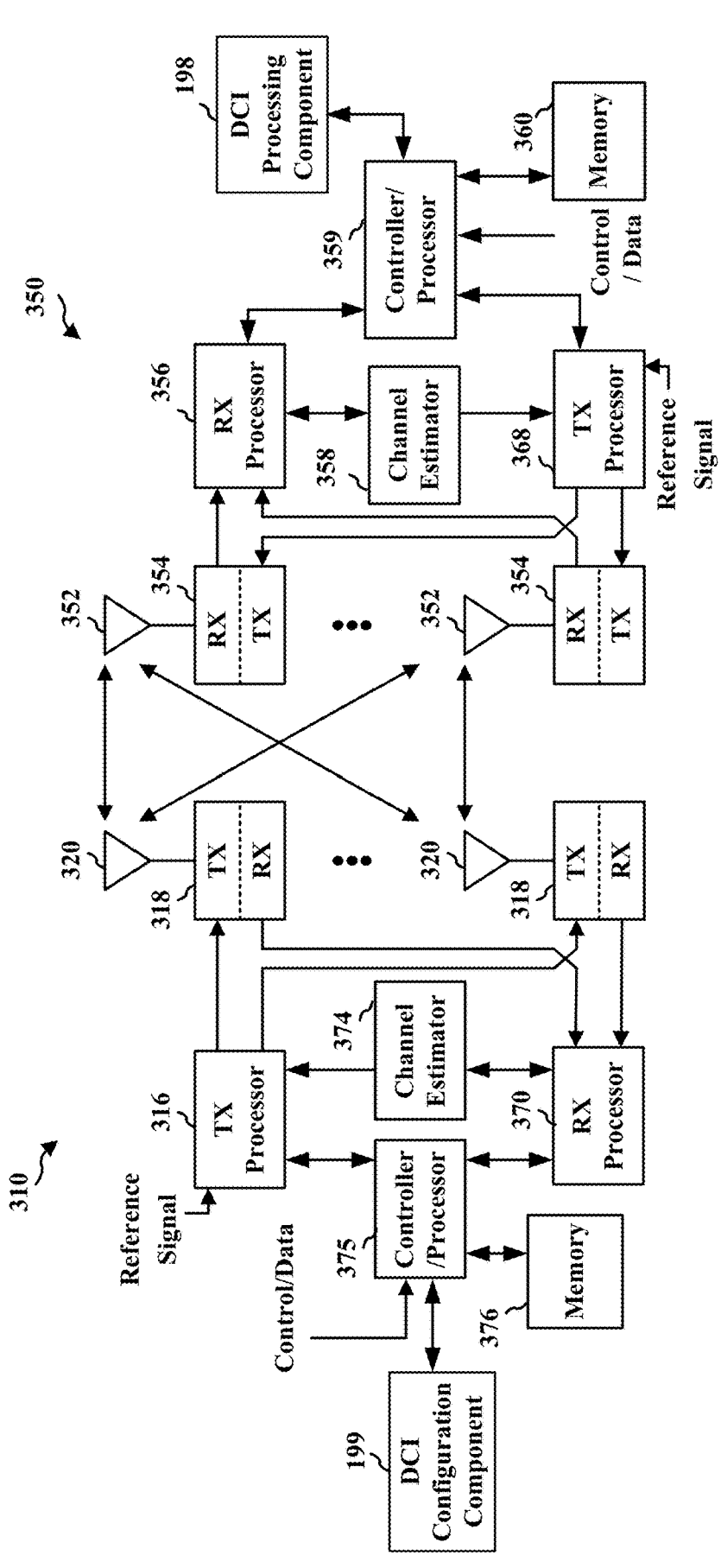
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Layer 1 (L1)/Layer 2 (L2) centric inter-cell mobility may associate non-serving cell RSs with TCI states for other cell measurement and report. Conventionally, TCI states may only be associated with serving cell beams/reference signals (RSs). If a TCI state can be associated with a non-serving cell RS, then a L1-based measurement and report framework for serving cell RSs can extend to cases of other cell RSs. In some aspects, fast handover data/control channel to TCI state of other cell beams can be supported. Enhanced measurement of other cell beams can be supported by associating AP-CSI-RS, TRS to other cell TCI state information.

In some aspects, updates associated with a non-serving cell TCI/RS may be received and processed. For example, when a UE moves around, the relevant non-serving RS to monitor also may need updating. In some aspects, the TCI state for a non-serving cell may also need updating. In some approaches, an update of a serving cell TCI state can be sent in MAC-CE, and the list of monitored non-serving cell RS for L3 mobility is configured in RRC signaling. The TCI state of non-serving cell may also be used to schedule CSI-RS or even data, and the beam indication for the CSI-RS or data may be sent in DCI. The non-serving cell RS may also be configured as path-loss reference signal (PL-RS) for an UL transmission.

L1/L2-centric inter-cell mobility may coexist in a network architecture that includes a non-standalone (NSA) system (e.g., LTE PCell and NR-PSCell), standalone system (SA), Intra-band carrier aggregation (CA), Intra-RAT (excluding inter-RAT), and Intra-frequency scenarios. In some aspects, the SSBs of non-serving cells have the same center frequency and SCS as the SSBs of the serving cell. In other aspects, an SSB of a non-serving cell is associated with a PCI different from the PCI of the serving cell.

In some aspects, measurement and reporting of non-serving RSs via incorporating non-serving cell info with some TCI(s) can be facilitated, along with the necessary measurement and reporting scheme(s). For example, there can be support for beam indication (TCI state update along with the necessary TCI state activation) for TCI(s) associated with non-serving cell RS(s). In some aspects, the metric for the measurement and reporting may include L1-RSRP or L3-RSRP or time- or spatial-domain-filtered L1-RSRP. In some aspects, the measurement and reporting may include a beam-level event-driven mechanism, using serving cell RS and/or non-serving cell RS. In some aspects, the network may facilitate serving cell to provide configurations for non-serving cell SSBs via RRC signaling. In some aspects, configurations may include information needed for L1/L2-centric inter-cell mobility (e.g. time/frequency location, transmission power, etc.). In some aspects, the non-serving cell SSB and non-serving cell RS can be part of the serving cell configuration.

In some aspects, the UE may support multi-beam measurement/reporting for L1/L2-centric inter-cell mobility and inter-cell multiple transmission and reception point (mTRP). In one reporting instance, depending on a network configuration, beam(s) associated with a non-serving cell can be mixed with that associated with serving-cell. In some aspects, this may apply to periodic, semi-persistent, and/or aperiodic scheduling. In some aspects, the UE may report K beams and corresponding qualities if the Tx power among the non-serving cell and with serving-cell is not the same. In some aspects, at least one of the K beams may originate from a non-serving cell. The UE may indicate in a UE capability the supported number of non-serving cells (in terms of measurement/reporting). In some aspects, only one non-serving cell may be allowed to be configured for measurement. In other aspects, more than one non-serving cell may be allowed to be configured for measurement. In some aspects, only one non-serving cell may be allowed in one reporting instance. In other aspects, more than one non-serving cell may be allowed in one reporting instance.

In some aspects, different cells (e.g., serving cell, non-serving cells) may have different Tx power and path loss to the UE. Consequently, the range of resulting RSRP values from different cells (e.g., serving cell, non-serving cells) may be different. For a serving cell beam report, when reporting more than one beam, differential reporting may be used by the UE. In other aspects, when beams are from different cells and RSRP ranges are significantly different, differential reporting also may be applied by the UE.

The present disclosure provides for channel state information report configuration for non-serving cell reference signals. In some aspects, RSRP values of beams from all cells (serving and non-serving) can be reported in a single group by the UE. The largest RSRP is reported in absolute value, using (X bits+ beam indication). The remaining RSRPs are reported in differential report manner, each using (Y bits+ beam indication). The differential can be either the difference from the largest RSRP, or the difference from the previous RSRP.

In some aspects, the RSRP values of beams from the same cell are reported in a group, where differential report is only performed within each cell. The UE may provide the cell ID in the beam report. In some aspects, X, Y bit width can be different for serving and non-serving cells. The grouping of cells by the UE may be performed for differential report purposes, of which all the groups of cells may still be reported in a single beam report occasion.

In some aspects, the RSRP values of beams from a cell group can be reported in a group by the UE, where differential report may only be performed within in each cell group. The UE may provide the cell ID in the beam report. The X, Y bit width can be different for the cell group associated with the serving and non-serving cells.

In some aspects, a base station 102/180 (e.g., gNB) may configure a cell group using explicit signaling to identify the cell groups. In other aspects, the UE may report its formation of cell group based on a measured RSRP, and report back to the base station (e.g. in the same beam report). In some aspects, the base station may indicate to the UE the transmission power of all cells to UE, and the UE can group the cells based on the indication. In some aspects, the cell with the same transmission power level may be grouped into the same group for reporting purposes. In some aspects, the UE can determine how to group the cells for differential reporting purposes, and indicate its decision to the base station 102/180.

In some aspects, the beam report for L1/L2 mobility can include measurements up to K beams and at least one of the measurements can correspond to a RS associated with a non-serving cell. In some aspects, the maximum number of K beams/cell group for reporting in a report may be based on a UE capability. In this regard, the UE can report its capability to the base station. In turn, the base station can configure the values K based on the UE capability.

In some aspects, the reported metrics used in the beam report can be L1 and L3 metrics (e.g., L1 RSRP, L3 RSRP, L1 SINR, L3 SINR). In some aspects, the L1 and L3 metrics can be mixed in one beam report. In some aspects, a single report can be configured with both L1 and L3 metrics. For example, the UE may report a list of RSs with both L1 and L3 metrics per RS. In this regard, the measurements can be sorted based on L1 or L3 metric (e.g., from largest to smallest L1-RSRP or L3-RSRP). In another aspect, the UE may report two lists of RSs with L1 in 1st list and L3 in 2nd list. For example, the measurements may be sorted based on L1 and L3, respectively, in a corresponding list. In another aspect, a single beam report can only be configured with either L1 or L3 metrics. In some aspects, the beam report may be configured by configuration signaling (e.g., CSI-ReportConfig). In some aspects, a differential report can be applied for metrics other than the largest measured metric, such as denoting a differential value relative to the largest measured metric. In some aspects, sorting can be across all reported cells or per reported cell/group.

In one or more implementations, the beam report can be event triggered. For example, the UE can be triggered to report an L1 metric for a beam originating from a serving cell or a non-serving cell if the triggering condition is satisfied. For example, the beam metric may be above an absolute threshold. In another example, the beam metric is above the best active beam by a predetermined decibel (dB) value (e.g., X dB). In still another example, the beam metric of the best active beam is below an absolute threshold and the beam metric is X dB above the best active beam.

In some aspects, the report/measurement can be periodic, semi-persistent, or aperiodic. The RS beam for measurement can be one of periodic, semi-persistent, or aperiodic. In some aspects, the beam report can be one of periodic, semi-persistent, or aperiodic, or a combination thereof.

Figure 4:
FIG. 4 is a diagram illustrating a configuration for a serving cell.

FIG. 4 is a diagram illustrating a configuration for a serving cell. For each serving cell (labeled by a physical cell identity (PCI)), the base station may configure multiple RS measurement and RS report configurations for L1/L2 mobility via RRC signaling. The configuration for a serving cell may include RS periodicity, time/frequency positions of the serving cell RSs, and Tx power of the serving cell RSs.

FIG. 5 is a diagram illustrating a configuration for a non-serving cell. Similarly to FIG. 4, for each non-serving cell (labeled by a physical cell identity (PCI)), the base station may configure multiple RS measurement and RS report configurations for L1/L2 mobility via RRC signaling. The RS can be SSB, CSI-RS of a non-serving cell. The configuration for a non-serving cell may include RS periodicity, time/frequency positions of the non-serving cell RSs, and Tx power of the non-serving cell RSs.

The MAC-CE can be used to activate and/or down-select from the multiple RS configurations. In some aspects, an activated configuration by MAC-CE can be limited to up to N per PCI, where N can equal to 1 or can be larger than 1. In some aspects, N can be configured by the base station via downlink configuration. The UE may report the maximum value of N that the UE can support (via the UE capability). After MAC-CE activation of RS measurement, the UE can start to monitor/measure the RSs (e.g., SSB/CSI-RS) from a non-serving cell. In some aspects, the activation for RS measurement and report can be from different signaling (MAC-CEs) as opposed to one MAC-CE.

Alternatively, the activation can be combined (e.g., a MAC-CE to activate RS measurement configuration of non-serving cell SSBs and its corresponding report configuration). The association of a RS measurement configuration and a report configuration may be preconfigured via RRC signaling.

The MAC-CE can be used to activate and/or down-select from the multiple RS configurations. In some aspects, an activated configuration by MAC-CE can be limited to up to N per PCI, where N can equal to 1 or can be larger than 1. In some aspects, N can be configured by the base station via downlink configuration. The UE may report the maximum value of N that the UE can support (via the UE capability). After MAC-CE activation of RS measurement, the UE can start to monitor/measure the RSs (e.g., SSB/CSI-RS) from a non-serving cell. In some aspects, the activation for RS measurement and report can be from different signaling (MAC-CEs) as opposed to one MAC-CE.

Alternatively, the activation can be combined (e.g., a MAC-CE to activate RS measurement configuration of non-serving cell SSBs and its corresponding report configuration). The association of a RS measurement configuration and a report configuration may be preconfigured via RRC signaling.

In some aspects, a RS beam for measurement can originate from another non-serving cell, or its associated TCI state is defined based on a non-serving cell RS. In some aspects, a first TCI state (e.g., TCI state 1) may be associated with a non-serving cell based on its own source RS being another cell's RS (e.g., SSB). Although the source RS of the TCI state may be defined in the serving cell, the chain to define a QCL relationship of the source RS can be defined based on the TCI/RS from the non-serving cell. In some aspects, there may be another TCI state (e.g., TCI state 2), whose source RS is quasi co-located to a RS whose TCI state is the first TCI state (e.g., TCI state 1). In this regard, the TCI state 2 and any RS quasi co-located to the TCI state 2 can be associated with the non-serving cell. For example, a first RS may be defined based on a first TCI state, and the first TCI state whose source RS (e.g., the first RS) is quasi co-located (e.g., QCL-D) to a SSB of a non-serving cell based on downlink signaling via RRC signaling indicating QCL information. In some aspects, different RSs from different cells may have different propagation delay to UE. Additionally, different receive timing may require measuring RSs associated with different non-serving cells from the receive timing of a serving cell. In some aspects, the RSs in adjacent symbols may require different receive timing, and the timing difference can be larger than a cyclic prefix (CP). In this regard, the UE can add a gap symbol between adjacent DL RS resources from serving and non-serving cells to account for different receive timing. In other aspects, the UE can add the gap symbol between adjacent DL RS resources from a different serving cell with a different timing advance value or from a different timing advance group. In some aspects, the UE can receive separate CSI RS resource configurations for non-serving and serving cells, or per cell, associated with a CSI report configuration. For example, the UE may not expect to measure RSs from different cells in adjacent symbols. In other aspects, the UE may receive a same CSI RS resource configuration for both non-serving and serving cells, associated with a CSI report configuration. In this regard, the gap symbol is configured as part of the configuration.

FIG. 6 is a flowchart of a process 600 of wireless communication of a UE that facilitates a downlink control information format for indication of transmission configuration indication state. The process 600 may be performed by a UE (e.g., the UE 104; UE 350), which may include the memory 360 and which may be the entire UE or a component of the UE, such as the TX processor 368, the RX processor 356, and/or the controller/processor 359. As illustrated, the process 600 includes a number of enumerated steps, but implementations of the process 600 may include additional steps before, after, and in between the enumerated steps. In some implementations, one or more of the enumerated steps may be omitted or performed in a different order.

At 602, the UE may receive, from a serving cell, a reference signal (RS) measurement configuration and a RS report configuration associated with a non-serving cell. In some aspects, the UE may receive, from the serving cell, a downlink configuration that indicates the RS measurement configuration and the RS report configuration for one or more physical cell identities (PCIs) associated with respective non-serving cells. For example, the UE may receive, from the serving cell, a media access control (MAC) control element (MAC-CE) that activates at least one of the RS measurement configuration or the RS report configuration up to N configurations per physical cell identity (PCI), where N is equivalent to or greater than 1. In another example, the UE may receive, from the serving cell, a first media access control (MAC) control element (MAC-CE) that activates the RS measurement configuration and a second MAC-CE that activates the RS report configuration. In some aspects, each of the RS measurement configuration and the RS report configuration comprises one or more of a configuration identifier, position information, periodicity information or a downlink transmission power.

At 604, the UE may monitor for a RS beam using a transmission configuration indicator (TCI) state associated with the non-serving cell based on the RS measurement configuration. In some aspects, the beams originate from the serving cell. In this regard, the UE may group the measured metric values into a group that corresponds to the serving cell. In some aspects, the beam report includes a cell identifier of the serving cell. In other aspects, the beams originate from a cell group associated with the non-serving cell, further comprising grouping the measured metric values into a group that corresponds to the cell group associated with the non-serving cell. The beam report may include a cell identifier of the cell group associated with the non-serving cell. In some aspects, the RS beam corresponds to one of a periodic waveform, a semi-persistent waveform or an aperiodic waveform. In some aspects, the RS beam associated with the non-serving cell is defined based on the TCI state that is quasi co-located with the RS beam associated with the non-serving cell.

In some aspects, the beams originate from a cell group associated with the serving cell. The UE may group the measured metric values into a group that corresponds to the cell group associated with the serving cell. In some aspects, the beam report includes a cell identifier of the cell group associated with the serving cell.

At 606, the UE may obtain one or more measurements of the RS beam associated with the non-serving cell. In some aspects, the UE obtains measured metric values of a plurality of beams associated with one or more serving cells and one or more non-serving cells. In some aspects, the one or more measurements includes a measurement indicating a largest measured metric value associated with one of the plurality of beams, further comprising generating the beam report that indicates the largest measured metric value using a first bit width and indicates the one of the plurality of beams associated with the largest measured metric value using an associated beam indication.

In some aspects, the measured metric values correspond to reference signal received power (RSRP) values associated with beams of the plurality of beams. In other aspects, the measured metric values correspond to signal-to-noise and interference ratio (SINR) values associated with beams of the plurality of beams. In some aspects, the beams originate from the non-serving cell, further comprising grouping the measured metric values into a group that corresponds to the non-serving cell. The beam report may include a cell identifier of the non-serving cell.

At 608, the UE may transmit, to the serving cell, a beam report indicating the one or more measurements of the RS beam associated with the non-serving cell and beam measurements associated with a serving cell based on the RS report configuration. In some aspects, the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication. In some aspects, each of the one or more differential values represents a difference between a respective one of the remaining measured metric values and the largest measured metric value. In some aspects, each of the one or more differential values represents a difference between a respective one of the remaining measured metric values and a previous measured metric value. In some aspects, the first bit width and the second bit width used for the non-serving cell are different when used for the serving cell. In some aspects, the beam report is transmitted based on one or more of a periodic schedule, a semi-persistent schedule or an aperiodic schedule.

The UE may perform differential reporting of one or more differential values within each of the serving cell and the non-serving cell. In some aspects, the UE may receive, from the serving cell, a downlink configuration that indicates configuration of a cell group.

In some aspects, the UE may group the serving cell and the non-serving cell into one or more cell groups based on the one or more measurements. In this regard, the UE may generate the beam report indicating the one or more cell groups, wherein the beam report indicates differential reporting within each of the one or more cell groups. In some aspects, the UE may receive, from the serving cell, an indication of a transmission power level for each of a plurality of cells, and group the plurality of cells into respective ones of one or more cell groups based on the indication of the transmission power level. In some aspects, cells with a same transmission power level are grouped in a same cell group. The UE can then generate the beam report indicating the one or more cell groups, wherein the beam report indicates differential reporting within each of the one or more cell groups.

In some aspects, the beam report indicates the one or more measurements for K beams, wherein at least one of the K beams includes a reference signal waveform associated with the non-serving cell. In some aspects, the UE may receive, from the serving cell, a downlink configuration that indicates configuration of a maximum number that corresponds to the K beams based on capability information of the UE, wherein the beam report indicates a number of beams included in the beam report that is not greater than the maximum number of K beams.

In some aspects, the one or more measurements include one or more of layer 1 (L1) beam metrics or layer 3 (L3) beam metrics, wherein the L1 beam metrics include L1 reference signal received power (RSRP) values and L1 signal-to-noise and interference ratio (SINR) values, wherein the L3 beam metrics include L3 RSRP values and L3 SINR values. In some aspects, the UE can generate the beam report indicating a list of reference signals with the L1 beam metrics and the L3 beam metrics per reference signal. In some aspects, the one or more measurements are sorted based on the L1 beam metrics or the L3 beam metrics in a predetermined order. In some aspects, the UE can generate the beam report indicating a first list of reference signals with the L1 beam metrics and a second list of reference signals with the L3 beam metrics. In some aspects, the one or more measurements in each of the first list of reference signals and the second list of reference signals are sorted based on the L1 beam metrics or the L3 beam metrics in a predetermined order.

In some aspects, the UE can generate the beam report indicating a list of reference signals that corresponds to one of the L1 beam metrics or the L3 beam metrics. In other aspects, the UE can generate the beam report indicating a list of reference signals that corresponds to one or more of the L1 beam metrics or the L3 beam metrics based on a channel state information (CSI) report downlink configuration. In some aspects, the UE can generate the beam report indicating a list of reference signals that corresponds to one or more of the L1 beam metrics or the L3 beam metrics with differential reporting applied to the L1 beam metrics and the L3 beam metrics. In other aspects, the UE can generate the beam report indicating a list of reference signals that corresponds to one or more of the L1 beam metrics or the L3 beam metrics with the L1 beam metrics and the L3 beam metrics sorted across all reported cells. In other aspects, the UE can generate the beam report indicating a list of reference signals that corresponds to one or more of the L1 beam metrics or the L3 beam metrics with the L1 beam metrics and the L3 beam metrics sorted per reported cell. In some aspects, the UE can generate the beam report indicating a list of reference signals that corresponds to one or more of the L1 beam metrics or the L3 beam metrics with the L1 beam metrics and the L3 beam metrics sorted per reported cell group.

In some aspects, the UE can generate the beam report indicating a L1 beam metric for a beam associated with a serving cell or a non-serving cell based on a triggering condition being satisfied. In some aspects, the triggering condition is satisfied when the L1 beam metric exceeds a predetermined threshold. In some aspects, the triggering condition is satisfied when the L1 beam metric is greater than an active beam by a predetermined decibel (dB) value. The triggering condition may be satisfied when the L1 beam metric is greater than a beam metric of an active beam by a predetermined decibel (dB) value and the beam metric of the active beam does not exceed a predetermined threshold.

In some aspects, the UE may receive a first reference signal associated with the non-serving cell at a first receive time, in which the first reference signal occupies a first resource. The UE may receive a second reference signal associated with the serving cell at a second receive time different than the first receive time. In some aspects, the second reference signal occupies a second resource that is adjacent to the first resource. The UE may apply one or more gap symbols between the first resource and the second resource based on a difference between the first receive time and the second receive time.

In some aspects, the UE may receive a first RS resource configuration associated with the non-serving cell and a second RS resource configuration associated with the serving cell, in which at least one of the first RS resource configuration or the second RS configuration indicates the one or more gap symbols. In other aspects, the UE may receive a common RS resource configuration associated with the non-serving cell and the serving cell, wherein the common RS configuration indicates the one or more gap symbols.

FIG. 7 is a flowchart of a process 700 of wireless communication of a base station that configures a downlink control information format for indication of transmission configuration indication state. The process 700 may be performed by a cell (e.g., serving cell, non-serving cell) or a base station, which may include the memory 376 and which may be the entire base station or a component of the base station, such as the TX processor 316, the RX processor 370, and/or the controller/processor 375. As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the base station may transmit, to a user equipment (UE), a reference signal (RS) measurement configuration and a RS report configuration associated with a non-serving cell.

At 704, the base station may receive, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration.

Figure 8:
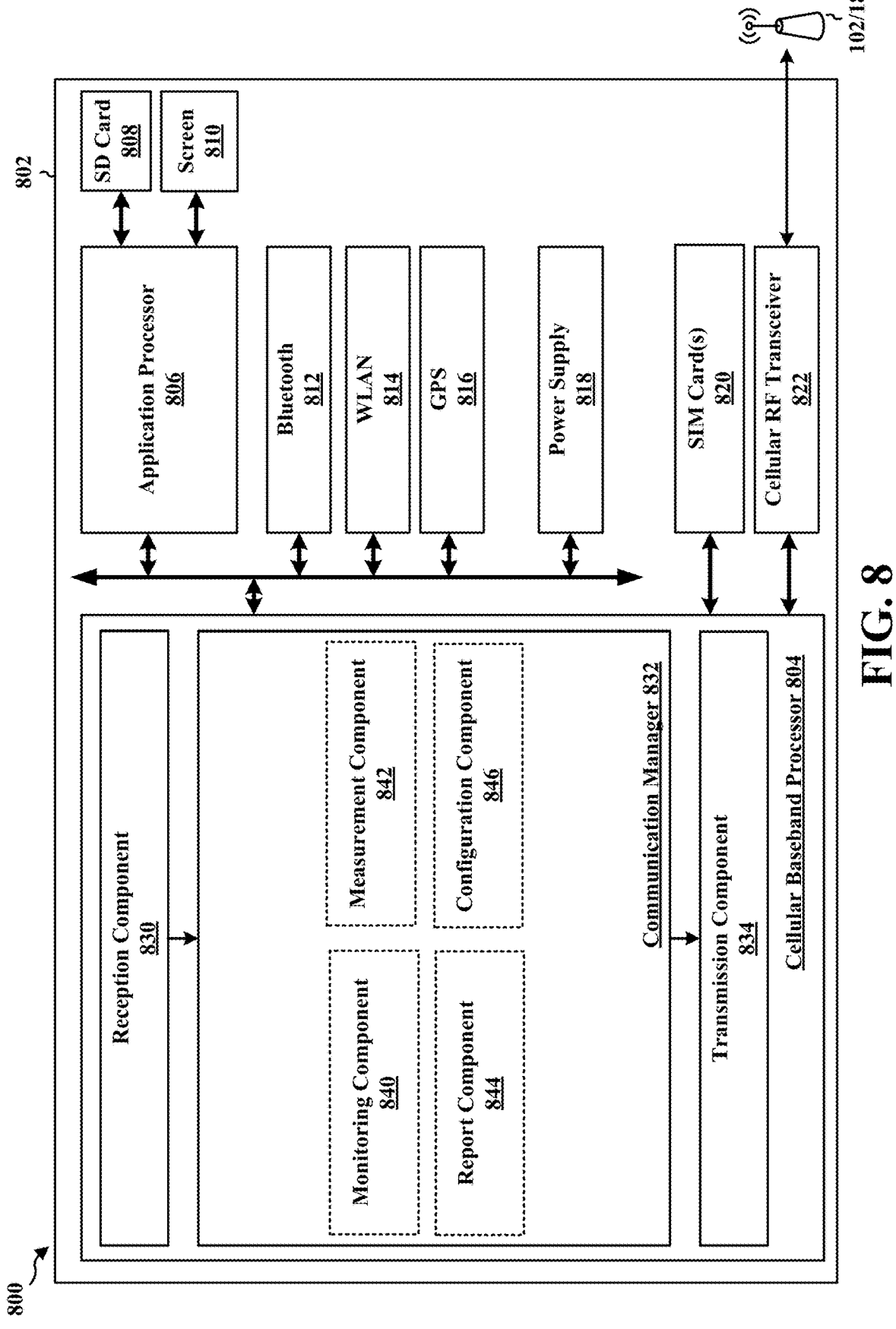
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software.

The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforementioned additional modules of the apparatus 802.

The communication manager 832 includes a monitoring component 840 that monitors for a RS beam using a transmission configuration indicator (TCI) state associated with the non-serving cell based on the RS measurement configuration, e.g., as described in reference to 604 of FIG. 6. The communication manager 832 further includes a measurement component 842 that obtains one or more measurements of the RS beam associated with the non-serving cell, e.g., as described in reference to 606 of FIG. 6. The communication manager 832 further includes a report component 844 that transmits, to the serving cell, a beam report indicating the one or more measurements of the RS beam associated with the non-serving cell and beam measurements associated with a serving cell based on the RS report configuration, via the transmission component 834. The communication manager 832 further includes a configuration component 846 that receives, from a serving cell, via the reception component 830, a reference signal (RS) measurement configuration and a RS report configuration associated with a non-serving cell, e.g., as described in reference to 602 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a serving cell, a reference signal (RS) measurement configuration and a RS report configuration associated with a non-serving cell; monitoring for a RS beam using a transmission configuration indicator (TCI) state associated with the non-serving cell based on the RS measurement configuration; obtaining one or more measurements of the RS beam associated with the non-serving cell; and transmitting, to the serving cell, a beam report indicating the one or more measurements of the RS beam associated with the non-serving cell and beam measurements associated with a serving cell based on the RS report configuration. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
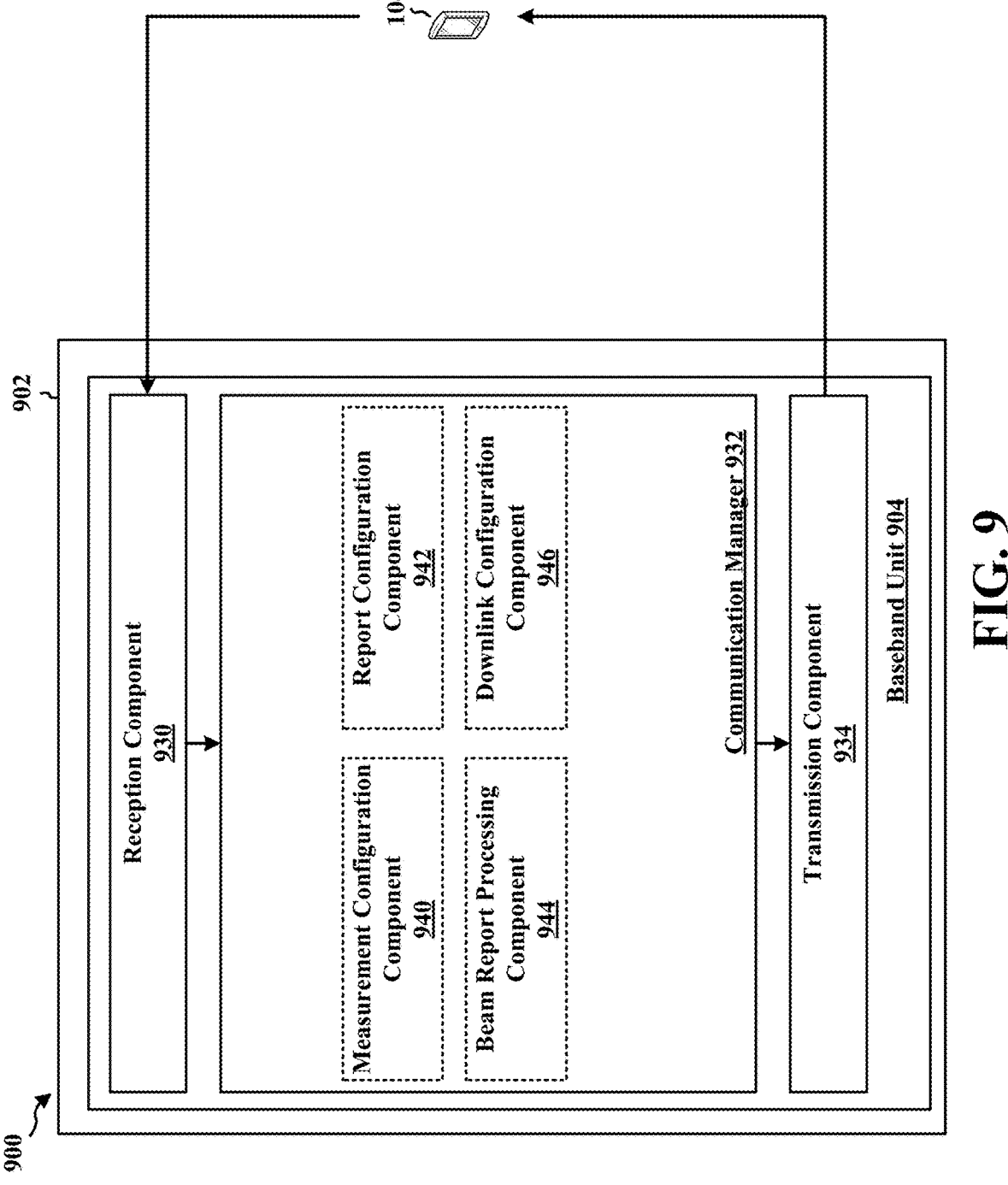
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a measurement configuration component 940 that transmits, to a user equipment (UE), a reference signal (RS) measurement configuration associated with a non-serving cell, e.g., as described in reference to 702 of FIG. 7. The communication manager 932 further includes a report configuration component 942 that that transmits, to the UE, a RS report configuration associated with a non-serving cell, e.g., as described in reference to 702 of FIG. 7. The communication manager 932 further includes a beam report processing component 944 that receives, from the UE, a beam report indicating one or more measurements of a RS beam associated with the non-serving cell and beam measurements associated with the serving cell based on the RS report configuration. In some aspects, the one or more measurements of the RS beam associated with the non-serving cell are based on a transmission configuration indicator (TCI) state associated with the non-serving cell and the RS measurement configuration. The communication manager 932 further includes a downlink configuration component 946 that transmits, to the UE, a downlink configuration that indicates configuration of a cell group. In some aspects, the downlink configuration component 946 may transmit, to the UE, a downlink configuration that indicates configuration of a maximum number for the K beams based on the capability information of the UE. In some aspects, the downlink configuration component 946 may transmit, to the UE, a downlink configuration that indicates the RS measurement configuration and the RS report configuration for one or more physical cell identities (PCIs) associated with respective non-serving cells. The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for generating downlink control information (DCI) with information indicating whether the DCI is intended for beam indication with or without downlink assignment, wherein the DCI includes one or more TCI codepoints in a TCI field of the DCI to apply one or more transmission configuration indication (TCI) states at the UE when the information in the DCI indicates that the DCI is intended for beam indication, and transmitting, to a user equipment (UE), the DCI. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other embodiments or teachings described herein, without limitation.

Aspect 1 is a method of wireless communication at a user equipment (UE) that includes receiving, from a serving cell, a reference signal (RS) measurement configuration and a RS report configuration associated with a non-serving cell;

monitoring for a RS beam using a transmission configuration indicator (TCI) state associated with the non-serving cell based on the RS measurement configuration; obtaining one or more measurements of the RS beam associated with the non-serving cell; and transmitting, to the serving cell, a beam report indicating the one or more measurements of the RS beam associated with the non-serving cell and beam measurements associated with a serving cell based on the RS report configuration.

In Aspect 2, the method of Aspect 1 further includes that the obtaining the one or more measurements comprises obtaining measured metric values of a plurality of beams associated with one or more serving cells and one or more non-serving cells.

In Aspect 3, the method of Aspect 1 or Aspect 2 further includes that the one or more measurements includes a measurement indicating a largest measured metric value associated with one of the plurality of beams, further comprising generating the beam report that indicates the largest measured metric value using a first bit width and indicates the one of the plurality of beams associated with the largest measured metric value using an associated beam indication.

In Aspect 4, the method of any of Aspects 1-3 further includes that the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication.

In Aspect 5, the method of any of Aspects 1-4, wherein each of the one or more differential values represents a difference between a respective one of the remaining measured metric values and the largest measured metric value.

In Aspect 6, the method of any of Aspects 1-4, wherein each of the one or more differential values represents a difference between a respective one of the remaining measured metric values and a previous measured metric value.

In Aspect 7, the method of any of Aspects 1-4 further includes that the first bit width and the second bit width used for the non-serving cell are different when used for the serving cell.

In Aspect 8, the method of any of Aspects 1-7 further includes that the measured metric values correspond to reference signal received power (RSRP) values associated with beams of the plurality of beams.

In Aspect 9, the method of any of Aspects 1-7 further includes that the measured metric values correspond to signal-to-noise and interference ratio (SINR) values associated with beams of the plurality of beams.

In Aspect 10, the method of any of Aspects 1-9 further includes that the beams originate from the non-serving cell, further comprising grouping the measured metric values into a group that corresponds to the non-serving cell.

In Aspect 11, the method of any of Aspects 1-10 further includes that the beam report includes a cell identifier of the non-serving cell.

In Aspect 12, the method of any of Aspects 1-11 further includes that the beams originate from the serving cell, further comprising grouping the measured metric values into a group that corresponds to the serving cell.

In Aspect 13, the method of any of Aspects 1-12 further includes that the beam report includes a cell identifier of the serving cell.

In Aspect 14, the method of any of Aspects 1-13 further includes that the beams originate from a cell group associated with the non-serving cell, further comprising grouping the measured metric values into a group that corresponds to the cell group associated with the non-serving cell.

In Aspect 15, the method of any of Aspects 1-14 further includes that the beam report includes a cell identifier of the cell group associated with the non-serving cell.

In Aspect 16, the method of any of Aspects 1-15 further includes that the beams originate from a cell group associated with the serving cell, further comprising grouping the measured metric values into a group that corresponds to the cell group associated with the serving cell.

In Aspect 17, the method of any of Aspects 1-16 further includes that the beam report includes a cell identifier of the cell group associated with the serving cell.

In Aspect 18, the method of any of Aspects 1-17, further comprising performing differential reporting of one or more differential values within each of the serving cell and the non-serving cell.

In Aspect 19, the method of any of Aspects 1-18, further comprising receiving, from the serving cell, a downlink configuration that indicates configuration of a cell group.

In Aspect 20, the method of any of Aspects 1-19, further comprising: grouping the serving cell and the non-serving cell into one or more cell groups based on the one or more measurements; and generating the beam report indicating the one or more cell groups, wherein the beam report indicates differential reporting within each of the one or more cell groups.

In Aspect 21, the method of any of Aspects 1-20, further comprising: receiving, from the serving cell, an indication of a transmission power level for each of a plurality of cells; grouping the plurality of cells into respective ones of one or more cell groups based on the indication of the transmission power level, wherein cells with a same transmission power level are grouped in a same cell group; and generating the beam report indicating the one or more cell groups, wherein the beam report indicates differential reporting within each of the one or more cell groups.

In Aspect 22, the method of any of Aspects 1-21 further includes that the beam report indicates the one or more measurements for K beams, wherein at least one of the K beams includes a reference signal waveform associated with the non-serving cell.

In Aspect 23, the method of any of Aspects 1-22, further comprising receiving, from the serving cell, a downlink configuration that indicates configuration of a maximum number that corresponds to the K beams based on capability information of the UE, wherein the beam report indicates a number of beams included in the beam report that is not greater than the maximum number of K beams.

In Aspect 24, the method of any of Aspects 1-23 further includes that the one or more measurements include one or more of layer 1 (L1) beam metrics or layer 3 (L3) beam metrics, wherein the L1 beam metrics include L1 reference signal received power (RSRP) values and L1 signal-to-noise and interference ratio (SINR) values, wherein the L3 beam metrics include L3 RSRP values and L3 SINR values.

In Aspect 25, the method of any of Aspects 1-24, further comprising generating the beam report indicating a list of reference signals with the L1 beam metrics and the L3 beam metrics per reference signal.

In Aspect 26, the method of any of Aspects 1-25 further includes that the one or more measurements are sorted based on the L1 beam metrics or the L3 beam metrics in a predetermined order.

In Aspect 27, the method of any of Aspects 1-26, further comprising generating the beam report indicating a first list of reference signals with the L1 beam metrics and a second list of reference signals with the L3 beam metrics.

In Aspect 28, the method of any of Aspects 1-27 further includes that the one or more measurements in each of the first list of reference signals and the second list of reference signals are sorted based on the L1 beam metrics or the L3 beam metrics in a predetermined order.

In Aspect 29, the method of any of Aspects 1-28, further comprising generating the beam report indicating a list of reference signals that corresponds to one of the L1 beam metrics or the L3 beam metrics.

In Aspect 30, the method of any of Aspects 1-29, further comprising generating the beam report indicating a list of reference signals that corresponds to one or more of the L1 beam metrics or the L3 beam metrics based on a channel state information (CSI) report downlink configuration.

In Aspect 31, the method of any of Aspects 1-30, further comprising generating the beam report indicating a list of reference signals that corresponds to one or more of the L1 beam metrics or the L3 beam metrics with differential reporting applied to the L1 beam metrics and the L3 beam metrics.

In Aspect 32, the method of any of Aspects 1-31, further comprising generating the beam report indicating a list of reference signals that corresponds to one or more of the L1 beam metrics or the L3 beam metrics with the L1 beam metrics and the L3 beam metrics sorted across all reported cells.

In Aspect 33, the method of any of Aspects 1-32, further comprising generating the beam report indicating a list of reference signals that corresponds to one or more of the L1 beam metrics or the L3 beam metrics with the L1 beam metrics and the L3 beam metrics sorted per reported cell.

In Aspect 34, the method of any of Aspects 1-33, further comprising generating the beam report indicating a list of reference signals that corresponds to one or more of the L1 beam metrics or the L3 beam metrics with the L1 beam metrics and the L3 beam metrics sorted per reported cell group.

In Aspect 35, the method of any of Aspects 1-34, further comprising generating the beam report indicating a L1 beam metric for a beam associated with a serving cell or a non-serving cell based on a triggering condition being satisfied.

In Aspect 36, the method of any of Aspects 1-35 further includes that the triggering condition is satisfied when the L1 beam metric exceeds a predetermined threshold.

In Aspect 37, the method of any of Aspects 1-35 further includes that the triggering condition is satisfied when the L1 beam metric is greater than an active beam by a predetermined decibel (dB) value.

In Aspect 38, the method of any of Aspects 1-35 further includes that the triggering condition is satisfied when the L1 beam metric is greater than a beam metric of an active beam by a predetermined decibel (dB) value and the beam metric of the active beam does not exceed a predetermined threshold.

In Aspect 39, the method of any of Aspects 1-36 further includes that the beam report is transmitted based on one or more of a periodic schedule, a semi-persistent schedule or an aperiodic schedule.

In Aspect 40, the method of any of Aspects 1-37 further includes that the RS beam corresponds to one of a periodic waveform, a semi-persistent waveform or an aperiodic waveform.

In Aspect 41, the method of any of Aspects 1-38 further includes receiving, from the serving cell, a downlink configuration that indicates the RS measurement configuration and the RS report configuration for one or more physical cell identities (PCIs) associated with respective non-serving cells.

In Aspect 42, the method of any of Aspects 1-41 further includes receiving, from the serving cell, a media access control (MAC) control element (MAC-CE) that activates at least one of the RS measurement configuration or the RS report configuration up to N configurations per physical cell identity (PCI), where N is equivalent to or greater than 1.

In Aspect 43, the method of any of Aspects 1-41 further includes receiving, from the serving cell, a first media access control (MAC) control element (MAC-CE) that activates the RS measurement configuration and a second MAC-CE that activates the RS report configuration.

In Aspect 44, the method of any of Aspects 1-43 further includes that each of the RS measurement configuration and the RS report configuration comprises one or more of a configuration identifier, position information, periodicity information or a downlink transmission power.

In Aspect 45, the method of any of Aspects 1-44 further includes receiving a first reference signal associated with the non-serving cell at a first receive time, wherein the first reference signal occupies a first resource; receiving a second reference signal associated with the serving cell at a second receive time different than the first receive time, wherein the second reference signal occupies a second resource that is adjacent to the first resource; and applying one or more gap symbols between the first resource and the second resource based on a difference between the first receive time and the second receive time.

In Aspect 46, the method of any of Aspects 1-45 further includes receiving a first RS resource configuration associated with the non-serving cell and a second RS resource configuration associated with the serving cell, wherein at least one of the first RS resource configuration or the second RS configuration indicates the one or more gap symbols.

In Aspect 47, the method of any of Aspects 1-45 further includes receiving a common RS resource configuration associated with the non-serving cell and the serving cell, wherein the common RS configuration indicates the one or more gap symbols.

In Aspect 48, the method of any of Aspects 1-47 further includes that the RS beam associated with the non-serving cell is defined based on the TCI state that is quasi co-located with the RS beam associated with the non-serving cell.

Aspect 49 is a method of wireless communication at a base station (BS) that includes transmitting, to a user equipment (UE), a reference signal (RS) measurement configuration and a RS report configuration associated with a non-serving cell; and receiving, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration.

In Aspect 50, the method of Aspect 49 further includes that the one or more measurements correspond to measured metric values of a plurality of beams associated with one or more serving cells and one or more non-serving cells, wherein the one or more measurements includes a measurement indicating a largest measured metric value associated with one of the plurality of beams, wherein the beam report indicates the largest measured metric value using a first bit width and indicates the one of the plurality of beams associated with the largest measured metric value using an associated beam indication.

In Aspect 51, the method of Aspect 49 or Aspect 50 further includes that the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication.

In Aspect 52, the method of any of Aspects 49-51 further includes that each of the one or more differential values represents a difference between a respective one of the remaining measured metric values and the largest measured metric value.

In Aspect 53, the method of any of Aspects 49-52 further includes that each of the one or more differential values represents a difference between a respective one of the remaining measured metric values and a previous measured metric value.

In Aspect 54, the method of any of Aspects 49-53 further includes that the first bit width and the second bit width used for the non-serving cell are different when used for the serving cell.

In Aspect 55, the method of any of Aspects 49-54 further includes that the beams originate from the non-serving cell, wherein the beam report indicates the measured metric values grouped into a group that corresponds to the non-serving cell.

In Aspect 56, the method of any of Aspects 49-55 further includes that the beam report includes a cell identifier of the non-serving cell.

In Aspect 57, the method of any of Aspects 49-56 further includes that the beams originate from the serving cell, wherein the beam report indicates the measured metric values grouped into a group that corresponds to the serving cell.

In Aspect 58, the method of any of Aspects 49-57 further includes that the beam report includes a cell identifier of the serving cell.

In Aspect 59, the method of any of Aspects 49-58 further includes that the beams originate from a cell group associated with the non-serving cell, wherein the beam report indicates the measured metric values grouped into a group that corresponds to the cell group associated with the non-serving cell.

In Aspect 60, the method of any of Aspects 49-59 further includes that the beam report includes a cell identifier of the cell group associated with the non-serving cell.

In Aspect 61, the method of any of Aspects 49-60 further includes that the beams originate from a cell group associated with the serving cell, wherein the beam report indicates the measured metric values grouped into a group that corresponds to the cell group associated with the serving cell.

In Aspect 62, the method of any of Aspects 49-61 further includes that the beam report includes a cell identifier of the cell group associated with the serving cell.

In Aspect 63, the method of any of Aspects 49-62 further includes transmitting, to the UE, a downlink configuration that indicates configuration of a cell group.

In Aspect 64, the method of any of Aspects 49-63 further includes that the beam report indicates the serving cell and the non-serving cell grouped into one or more cell groups based on the one or more measurements, wherein the beam report indicates differential reporting within each of the one or more cell groups.

In Aspect 65, the method of any of Aspects 49-63 further includes transmitting, to the UE, an indication of a transmission power level for each of a plurality of cells, wherein the beam report indicates the plurality of cells into respective ones of one or more cell groups based on the indication of the transmission power level, wherein cells with a same transmission power level are grouped in a same cell group, wherein the beam report indicates differential reporting within each of the one or more cell groups.

In Aspect 66, the method of any of Aspects 49-65 further includes that the beam report indicates the one or more measurements for K beams, wherein at least one of the K beams includes a reference signal waveform associated with the non-serving cell.

In Aspect 67, the method of any of Aspects 49-66 further includes receiving, from the UE, capability information of the UE; and transmitting, to the UE, a downlink configuration that indicates configuration of a maximum number for the K beams based on the capability information of the UE.

In Aspect 68, the method of any of Aspects 49-67 further includes that the one or more measurements include one or more of layer 1 (L1) beam metrics or layer 3 (L3) beam metrics, wherein the L1 beam metrics include L1 reference signal received power (RSRP) values and L1 signal-to-noise and interference ratio (SINR) values, wherein the L3 beam metrics include L3 RSRP values and L3 SINR values.

In Aspect 69, the method of any of Aspects 49-68 further includes that the beam report indicates a list of reference signals with the L1 beam metrics and the L3 beam metrics per reference signal.

In Aspect 70, the method of any of Aspects 49-69 further includes transmitting, to the UE, an indication of a predetermined order for the L1 beam metrics and the L3 beam metrics, wherein the one or more measurements in the beam report are sorted based on the L1 beam metrics or the L3 beam metrics in the predetermined order.

In Aspect 71, the method of any of Aspects 49-70 further includes that the beam report indicates a first list of reference signals with the L1 beam metrics and a second list of reference signals with the L3 beam metrics.

In Aspect 72, the method of any of Aspects 49-71 further includes transmitting, to the UE, an indication of a predetermined order for the L1 beam metrics and the L3 beam metrics, wherein the one or more measurements in each of the first list of reference signals and the second list of reference signals are sorted based on the L1 beam metrics or the L3 beam metrics in the predetermined order.

In Aspect 73, the method of any of Aspects 49-72 further includes that the beam report indicates a list of reference signals that corresponds to one of the L1 beam metrics or the L3 beam metrics.

In Aspect 74, the method of any of Aspects 49-73 further includes that the beam report indicates a list of reference signals that corresponds to one or more of the L1 beam metrics or the L3 beam metrics based on a channel state information (CSI) report downlink configuration.

In Aspect 75, the method of any of Aspects 49-74 further includes that the beam report indicates a list of reference signals that corresponds to one or more of the L1 beam metrics or the L3 beam metrics with differential reporting applied to the L1 beam metrics and the L3 beam metrics.

In Aspect 76, the method of any of Aspects 49-75 further includes that the beam report indicates a list of reference signals that corresponds to one or more of the L1 beam metrics or the L3 beam metrics with the L1 beam metrics and the L3 beam metrics sorted across all reported cells.

In Aspect 77, the method of any of Aspects 49-76 further includes that the beam report indicates a list of reference signals that corresponds to one or more of the L1 beam metrics or the L3 beam metrics with the L1 beam metrics and the L3 beam metrics sorted per reported cell.

In Aspect 78, the method of any of Aspects 49-77 further includes that the beam report indicates a list of reference signals that corresponds to one or more of the L1 beam metrics or the L3 beam metrics with the L1 beam metrics and the L3 beam metrics sorted per reported cell group.

In Aspect 79, the method of any of Aspects 49-78 further includes that the beam report indicates a L1 beam metric for a beam associated with a serving cell or a non-serving cell based on a triggering condition being satisfied.

In Aspect 80, the method of any of Aspects 49-79 further includes that the triggering condition is satisfied when the L1 beam metric exceeds a predetermined threshold.

In Aspect 81, the method of any of Aspects 49-79 further includes that the triggering condition is satisfied when the L1 beam metric is greater than an active beam by a predetermined decibel (dB) value.

In Aspect 82, the method of any of Aspects 49-79 further includes that the triggering condition is satisfied when the L1 beam metric is greater than a beam metric of an active beam by a predetermined decibel (dB) value and the beam metric of the active beam does not exceed a predetermined threshold.

In Aspect 83, the method of any of Aspects 49-82 further includes that the beam report is received based on one or more of a periodic schedule, a semi-persistent schedule or an aperiodic schedule.

In Aspect 84, the method of any of Aspects 49-83 further includes that the RS beam corresponds to one of a periodic waveform, a semi-persistent waveform or an aperiodic waveform.

In Aspect 85, the method of any of Aspects 49-84 further includes transmitting, to the UE, a downlink configuration that indicates the RS measurement configuration and the RS report configuration for one or more physical cell identities (PCIs) associated with respective non-serving cells.

In Aspect 86, the method of any of Aspects 49-85 further includes transmitting, to the UE, a media access control (MAC) control element (MAC-CE) that activates at least one of the RS measurement configuration or the RS report configuration up to N configurations per physical cell identity (PCI), where N is equivalent to or greater than 1.

In Aspect 87, the method of any of Aspects 49-85 further includes transmitting, to the UE, a first media access control (MAC) control element (MAC-CE) that activates the RS measurement configuration and a second MAC-CE that activates the RS report configuration.

In Aspect 88, the method of any of Aspects 49-87 further includes that each of the RS measurement configuration and the RS report configuration comprises one or more of a configuration identifier, position information, periodicity information or a downlink transmission power.

In Aspect 89, the method of any of Aspects 49-88 further includes transmitting, to the UE, a first RS resource configuration associated with the non-serving cell and a second RS resource configuration associated with the serving cell, wherein at least one of the first RS resource configuration or the second RS configuration indicates one or more gap symbols to be used between a first resource occupied by a first reference signal associated with the non-serving cell and a second resource occupied by a second reference signal associated with the serving cell when the first reference signal is received at the UE at a first receive time and the second reference signal is received at the UE at a second receive time different than the first receive time.

In Aspect 90, the method of any of Aspects 49-89 further includes transmitting, to the UE, a common RS resource configuration associated with the non-serving cell and the serving cell, wherein the common RS configuration indicates the one or more gap symbols.

In Aspect 91, the method of any of Aspects 49-49 further includes that the RS beam associated with the non-serving cell is defined based on the TCI state that is quasi co-located with the RS beam associated with the non-serving cell.

Aspect 92 is a device including one or more processors and one or more memories in electronic communication with the one or more processors storing instructions executable by the one or more processors to cause a system or an apparatus to implement a method as in any of Aspects 1 to 48.

Aspect 93 is a system or apparatus including means for implementing a method or realizing an apparatus as in any of Aspects 1 to 48.

Aspect 94 is a non-transitory computer-readable medium storing instructions executable by one or more processors to cause the one or more processors to implement a method as in any of Aspects 1 to 48.

Aspect 95 is a device including one or more processors and one or more memories in electronic communication with the one or more processors storing instructions executable by the one or more processors to cause a system or an apparatus to implement a method as in any of Aspects 49 to 91.

Aspect 96 is a system or apparatus including means for implementing a method or realizing an apparatus as in any of Aspects 49 to 91.

Aspect 97 is a non-transitory computer-readable medium storing instructions executable by one or more processors to cause the one or more processors to implement a method as in any of Aspects 49 to 91.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:

receiving, from a serving cell, a reference signal (RS) measurement configuration and a RS report configuration associated with a non-serving cell;

monitoring for a RS beam using a transmission configuration indicator (TCI) state associated with the non-serving cell based on the RS measurement configuration;

obtaining one or more measurements of the RS beam associated with the non-serving cell and the serving cell, wherein the obtaining the one or more measurements comprises obtaining measured metric values of a plurality of beams associated with the serving cell and the non-serving cell, wherein the one or more measurements includes a measurement indicating a largest measured metric value associated with one of the plurality of beams;

generating a beam report that indicates the largest measured metric value using a first bit width and indicates the one of the plurality of beams associated with the largest measured metric value using an associated beam indication, wherein the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication; and transmitting, to the serving cell, a beam report indicating the one or more measurements of the RS beam associated with the non-serving cell and beam measurements associated with the serving cell based on the RS report configuration.

2. The method of claim 1, wherein each of the one or more differential values represents a difference between a respective one of the remaining measured metric values and the largest measured metric value.

3. The method of claim 1, wherein each of the one or more differential values represents a difference between a respective one of the remaining measured metric values and a previous measured metric value.

4. The method of claim 1, wherein the first bit width and the second bit width used for the non-serving cell are different when used for the serving cell.

5. The method of claim 1, wherein the measured metric values correspond to reference signal received power (RSRP) values associated with beams of the plurality of beams.

6. The method of claim 1, wherein the measured metric values correspond to signal-to-noise and interference ratio (SINR) values associated with beams of the plurality of beams.

7. The method of claim 1, wherein at least one beam of the plurality of beams originate from the non-serving cell, further comprising grouping the measured metric values into a group that corresponds to the non-serving cell, wherein the beam report includes a cell identifier of the non-serving cell.

8. The method of claim 1, wherein at least one beam of the plurality of beams originate from the serving cell, further comprising grouping the measured metric values into a group that corresponds to the serving cell, wherein the beam report includes a cell identifier of the serving cell.

9. The method of claim 1, wherein at least one beam of the plurality of beams originate from a cell group associated with the non-serving cell, further comprising grouping the measured metric values into a group that corresponds to the cell group associated with the non-serving cell, wherein the beam report includes a cell identifier of the cell group associated with the non-serving cell.

10. The method of claim 1, wherein at least one beam of the plurality of beams originate from a cell group associated with the serving cell, further comprising grouping the measured metric values into a group that corresponds to the cell group associated with the serving cell, wherein the beam report includes a cell identifier of the cell group associated with the serving cell.

11. The method of claim 1, further comprising receiving, from the serving cell, a downlink configuration that indicates configuration of a cell group.

12. The method of claim 1, further comprising:
grouping the serving cell and the non-serving cell into one or more cell groups based on the one or more measurements; and
wherein generating the beam report comprises generating the beam report indicating the one or more cell groups, wherein the beam report indicates differential reporting within each of the one or more cell groups.

13. The method of claim 1, further comprising:
receiving, from the serving cell, an indication of a transmission power level for each of a plurality of cells;
grouping the plurality of cells into respective ones of one or more cell groups based on the indication of the transmission power level, wherein cells with a same transmission power level are grouped in a same cell group; and
wherein generating the beam report comprises generating the beam report indicating the one or more cell groups, wherein the beam report indicates differential reporting within each of the one or more cell groups.

14. The method of claim 1, wherein the beam report indicates the one or more measurements for K beams, wherein at least one of the K beams includes a reference signal waveform associated with the non-serving cell, further comprising receiving, from the serving cell, a downlink configuration that indicates configuration of a maximum number that corresponds to the K beams based on capability information of the UE, wherein the beam report indicates a number of beams included in the beam report that is not greater than the maximum number of K beams.

15. The method of claim 1, wherein the one or more measurements include one or more of layer 1 (L1) beam metrics or layer 3 (L3) beam metrics, wherein the L1 beam metrics include L1 reference signal received power (RSRP) values and L1 signal-to-noise and interference ratio (SINR) values, wherein the L3 beam metrics include L3 RSRP values and L3 SINR values.

16. The method of claim 15, the beam report further indicating a list of reference signals with the L1 beam metrics and the L3 beam metrics per reference signal, wherein the one or more measurements are sorted based on the L1 beam metrics or the L3 beam metrics in a predetermined order.

17. The method of claim 15, the beam report further indicating a first list of reference signals with the L1 beam metrics and a second list of reference signals with the L3 beam metrics, wherein the one or more measurements in each of the first list of reference signals and the second list of reference signals are sorted based on the L1 beam metrics or the L3 beam metrics in a predetermined order.

18. The method of claim 15, the beam report further indicating a list of reference signals that corresponds to one of the L1 beam metrics or the L3 beam metrics.

19. The method of claim 15, the beam report further indicating a list of reference signals that corresponds to one or more of the L1 beam metrics or the L3 beam metrics based on a channel state information (CSI) report downlink configuration.

20. The method of claim 15, the beam report further indicating a list of reference signals that corresponds to one or more of the L1 beam metrics or the L3 beam metrics with differential reporting applied to the L1 beam metrics and the L3 beam metrics.

21. The method of claim 15, the beam report further indicating a list of reference signals that corresponds to one or more of the L1 beam metrics or the L3 beam metrics with the L1 beam metrics and the L3 beam metrics sorted across all reported cells.

22. The method of claim 15, the beam report further indicating a list of reference signals that corresponds to one or more of the L1 beam metrics or the L3 beam metrics with the L1 beam metrics and the L3 beam metrics sorted per reported cell.

23. The method of claim 15, the beam report further a list of reference signals that corresponds to one or more of the L1 beam metrics or the L3 beam metrics with the L1 beam metrics and the L3 beam metrics sorted per reported cell group.

24. The method of claim 15, the beam report further indicating a L1 beam metric for a beam associated with the serving cell or the non-serving cell based on a triggering condition being satisfied.

25. The method of claim 24, wherein the triggering condition is satisfied when the L1 beam metric exceeds a predetermined threshold.

26. The method of claim 24, wherein the triggering condition is satisfied when the L1 beam metric is greater than an active beam by a predetermined decibel (dB) value.

27. The method of claim 24, wherein the triggering condition is satisfied when the L1 beam metric is greater than a beam metric of an active beam by a predetermined decibel (dB) value and the beam metric of the active beam does not exceed a predetermined threshold.

28. The method of claim 1, wherein the beam report is transmitted based on one or more of a periodic schedule, a semi-persistent schedule or an aperiodic schedule.

29. The method of claim 1, wherein the RS beam of the non-serving cell corresponds to one of a periodic waveform, a semi-persistent waveform or an aperiodic waveform.

30. The method of claim 1, further comprising receiving, from the serving cell, a downlink configuration that indicates the RS measurement configuration and the RS report configuration for one or more physical cell identities (PCIs) associated with respective non-serving cells.

31. The method of claim 30, further comprising receiving, from the serving cell, a media access control (MAC) control element (MAC-CE) that activates at least one of the RS measurement configuration or the RS report configuration up to N configurations per physical cell identity (PCI), where N is equivalent to or greater than 1.

32. The method of claim 30, further comprising receiving, from the serving cell, a first media access control (MAC) control element (MAC-CE) that activates the RS measurement configuration and a second MAC-CE that activates the RS report configuration.

33. The method of claim 1, wherein each of the RS measurement configuration and the RS report configuration comprises one or more of a configuration identifier, position information, periodicity information or a downlink transmission power.

34. The method of claim 1, further comprising:
receiving a first reference signal associated with the non-serving cell at a first receive time, wherein the first reference signal occupies a first resource;
receiving a second reference signal associated with the serving cell at a second receive time different than the first receive time, wherein the second reference signal occupies a second resource that is adjacent to the first resource; and
applying one or more gap symbols between the first resource and the second resource based on a difference between the first receive time and the second receive time.

35. The method of claim 34, further comprising receiving a first RS resource configuration associated with the non-serving cell and a second RS resource configuration associated with the serving cell, wherein at least one of the first RS resource configuration or the second RS configuration indicates the one or more gap symbols.

36. The method of claim 34, further comprising receiving a common RS resource configuration associated with the non-serving cell and the serving cell, wherein the common RS configuration indicates the one or more gap symbols.

37. The method of claim 1, wherein the RS beam associated with the non-serving cell is defined based on the TCI state that is quasi co-located with the RS beam associated with the non-serving cell.

38. An apparatus for wireless communication, the apparatus comprising:
a transceiver;
one or more memories, individually or in combination, having instructions; and one or more processors, individually or in combination, configured to execute the instructions and cause the apparatus to:
receive, from a serving cell, a reference signal (RS) measurement configuration and a RS report configuration associated with a non-serving cell;
monitor for a RS beam using a transmission configuration indicator (TCI) state associated with the non-serving cell based on the RS measurement configuration;
obtain one or more measurements of the RS beam associated with the non-serving cell and the serving cell, wherein the obtaining the one or more measurements comprises obtaining measured metric values of a plurality of beams associated with the serving cell and the non-serving cell, wherein the one or more measurements includes a measurement indicating a largest measured metric value associated with one of the plurality of beams;
generate a beam report that indicates the largest measured metric value using a first bit width and indicates the one of the plurality of beams associated with the largest measured metric value using an associated beam indication, wherein the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication; and
transmit, to the serving cell, a beam report indicating the one or more measurements of the RS beam associated with the non-serving cell and beam measurements associated with the serving cell based on the RS report configuration.

39. A method of wireless communication at a serving cell, the method comprising:
transmitting, to a user equipment (UE), a reference signal (RS) measurement configuration and a RS report configuration associated with a non-serving cell; and
receiving, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration,
wherein the one or more measurements comprise measured metric values of a plurality of beams associated with the serving cell and the non-serving cell, wherein the beam report indicates a largest measured metric value using a first bit width and indicates one of the plurality of beams associated with the largest measured metric value using an associated beam indication, wherein the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication.

40. An apparatus for wireless communication at a serving cell, the apparatus comprising:

a memory;

a transceiver; and at least one processor coupled to the memory and the transceiver, the at least one processor configured to:

transmit, to a user equipment (UE), a reference signal (RS) measurement configuration and a RS report configuration associated with a non-serving cell; and receive, from the UE, a beam report indicating one or more measurements of a RS beam associated with the non-serving cell and beam measurements associated with the serving cell based on the RS report configuration, wherein the one or more measurements of the RS beam associated with the non-serving cell are based on a transmission configuration indicator (TCI) state associated with the non-serving cell and the RS measurement configuration, wherein the one or more measurements comprise measured metric values of a plurality of beams associated with the serving cell and the non-serving cell, wherein the beam report indicates a largest measured metric value using a first bit width and indicates one of the plurality of beams associated with the largest measured metric value using an associated beam indication, wherein the beam report includes one or more differential values that correspond to remaining measured metric values associated with other beams of the plurality of beams, wherein each of the one or more differential values indicates the remaining measured metric values using a second bit width smaller than the first bit width and indicates each of the other beams associated with a respective one of the remaining measured metric values using an associated beam indication.

\* \* \* \* \*